(12) United States Patent
Shkel et al.

(10) Patent No.: US 8,567,247 B2
(45) Date of Patent: Oct. 29, 2013

(54) THREE-DIMENSIONAL WAFER-SCALE BATCH-MICROMACHINED SENSOR AND METHOD OF FABRICATION FOR THE SAME

(75) Inventors: Andrei M. Shkel, Irvine, CA (US); Alexander A. Trusov, Irvine, CA (US); Igor P. Prikhodko, Westminster, CA (US); Sergei A. Zotov, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 493 days.

(21) Appl. No.: 12/893,691

(22) Filed: Sep. 29, 2010

(65) Prior Publication Data
US 2011/0239763 A1 Oct. 6, 2011

Related U.S. Application Data

(60) Provisional application No. 61/250,849, filed on Oct. 12, 2009.

(51) Int. Cl.
*G01C 19/00* (2013.01)

(52) U.S. Cl.
USPC ........................................ 73/504.13; 156/145

(58) Field of Classification Search
USPC .............. 73/504.12, 504.13; 216/33; 156/145
See application file for complete search history.

(56) References Cited

U.S. PATENT DOCUMENTS

| | | | |
|---|---|---|---|
| 6,367,786 B1 * | 4/2002 | Gutierrez et al. | 267/136 |
| 6,481,284 B2 * | 11/2002 | Geen et al. | 73/504.12 |
| 6,481,285 B1 * | 11/2002 | Shkel et al. | 73/504.13 |
| 6,628,177 B2 * | 9/2003 | Clark et al. | 333/186 |
| 6,629,460 B2 * | 10/2003 | Challoner | 73/504.02 |
| 6,796,179 B2 * | 9/2004 | Bae et al. | 73/504.12 |
| 6,856,217 B1 * | 2/2005 | Clark et al. | 333/186 |
| 6,944,931 B2 * | 9/2005 | Shcheglov et al. | 29/595 |
| 6,985,051 B2 * | 1/2006 | Nguyen et al. | 333/186 |
| 7,040,163 B2 * | 5/2006 | Shcheglov et al. | 73/504.13 |
| 7,168,318 B2 * | 1/2007 | Challoner et al. | 73/504.13 |
| 7,437,253 B2 * | 10/2008 | Shcheglov et al. | 702/75 |
| 7,581,443 B2 * | 9/2009 | Kubena et al. | 73/504.12 |
| 7,892,191 B2 * | 2/2011 | Zumeris et al. | 601/46 |
| 7,987,714 B2 * | 8/2011 | DeNatale et al. | 73/504.13 |
| 8,109,145 B2 * | 2/2012 | Stewart | 73/504.13 |
| 8,393,212 B2 * | 3/2013 | Ge et al. | 73/504.13 |
| 2003/0029238 A1 * | 2/2003 | Challoner | 73/504.04 |
| 2005/0268921 A1 * | 12/2005 | Zumeris et al. | 128/898 |
| 2007/0017287 A1 * | 1/2007 | Kubena et al. | 73/504.02 |

* cited by examiner

*Primary Examiner* — Peter Macchiarolo
*Assistant Examiner* — Samir M Shah
(74) *Attorney, Agent, or Firm* — Marcus C. Dawes; Daniel L. Dawes

(57) ABSTRACT

A vibratory sensor is fabricated as a three-dimensional batch-micromachined shell adapted to vibrate and support elastic wave propagation and wave precession in the shell or membrane and at least one driving electrode and preferably a plurality of driving electrodes directly or indirectly coupled to the shell to excite and sustain the elastic waves in the shell. The pattern of elastic waves is determined by the configuration of the driving electrode(s). At least one sensing electrode and preferably a plurality of sensing electrodes are provided to detect the precession of the elastic wave pattern in the shell. The rotation of the shell induces precession of the elastic wave pattern in the shell which is usable to measure the rotation angle or rate of the vibratory sensor.

14 Claims, 9 Drawing Sheets

1mm

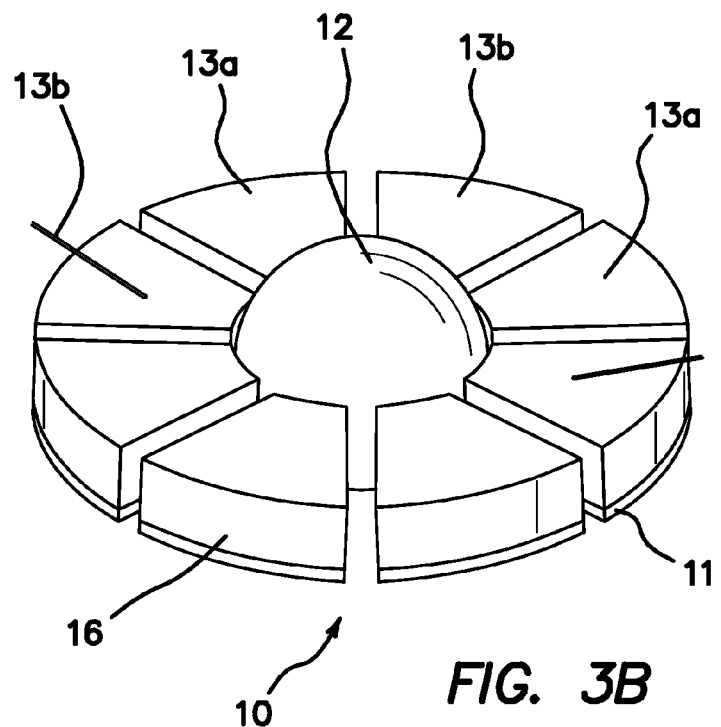
FIG. 3B
FIG. 3C
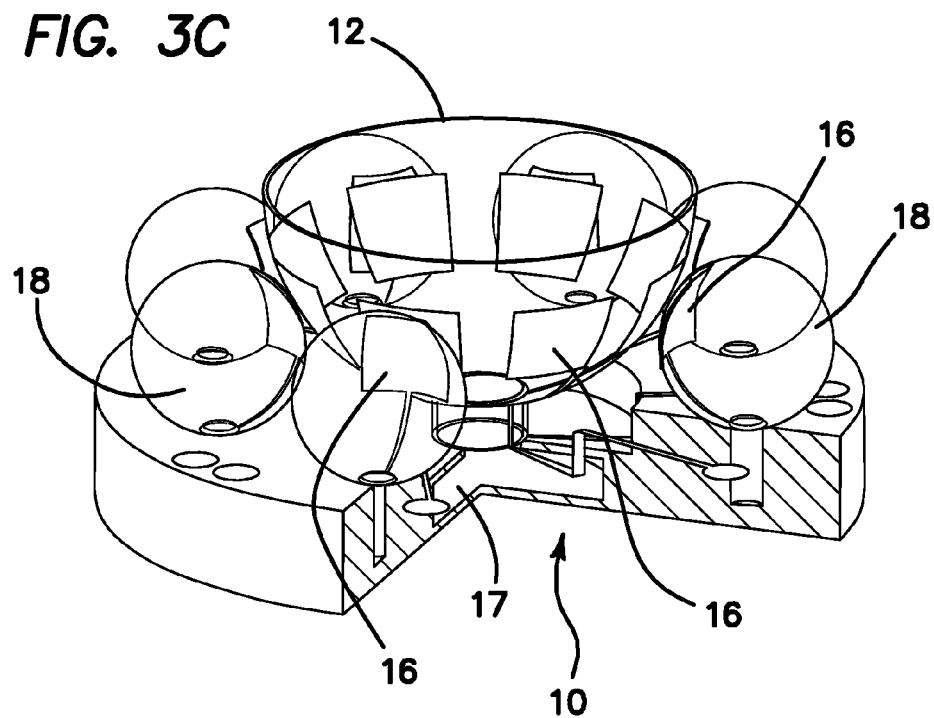

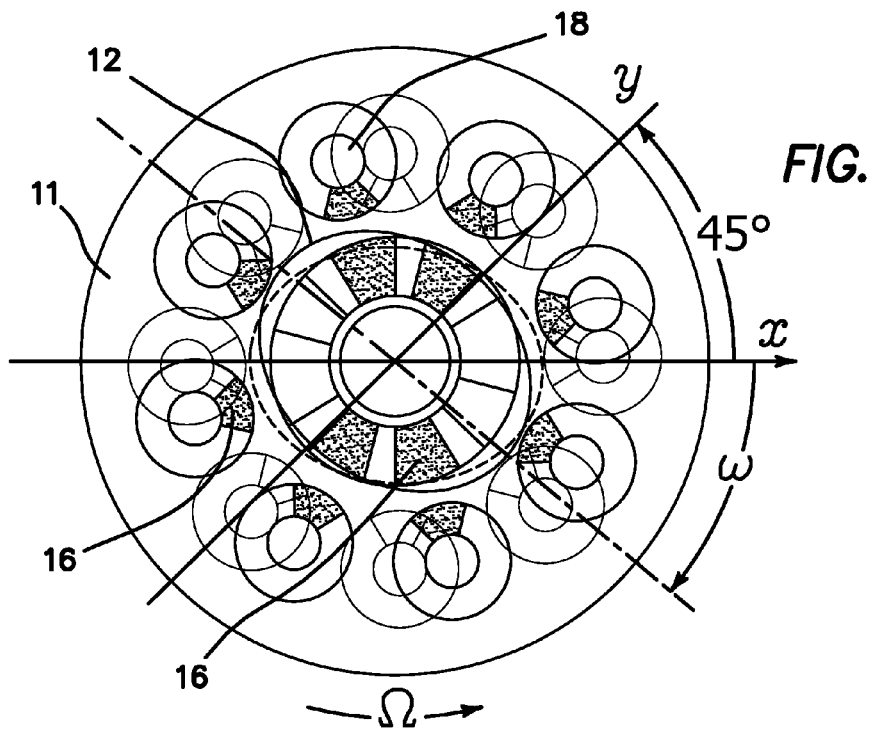
FIG. 4B
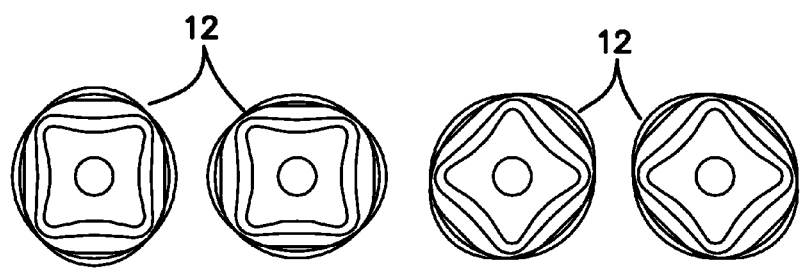
Half-periods of vibration: first mode
FIG. 5A
Half-periods of vibration: second mode
FIG. 5B
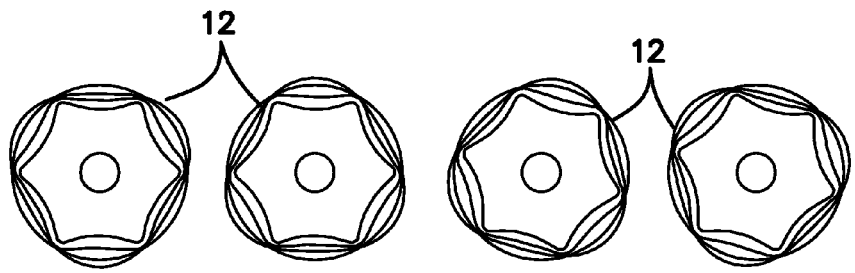
Half-periods of vibration: third mode
FIG. 6A
Half-periods of vibration: fourth mode
FIG. 6B

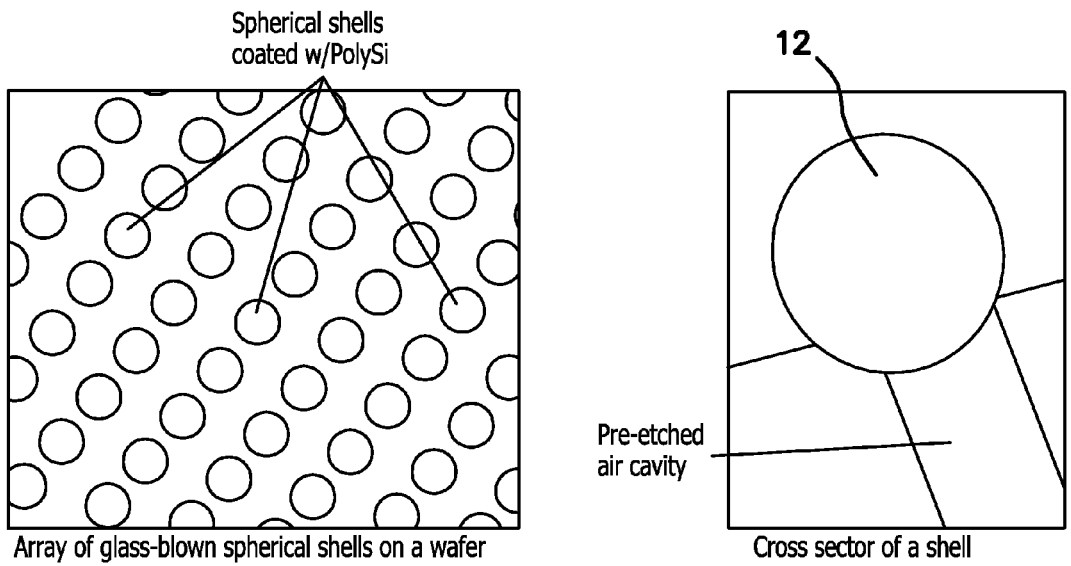

Spherical shells coated w/PolySi

Array of glass-blown spherical shells on a wafer coated with polycrystalline silicon layer, Individual shell can be used a sensitive element of MSRG.

FIG. 7A

Pre-etched air cavity

Cross sector of a shell

FIG. 7B

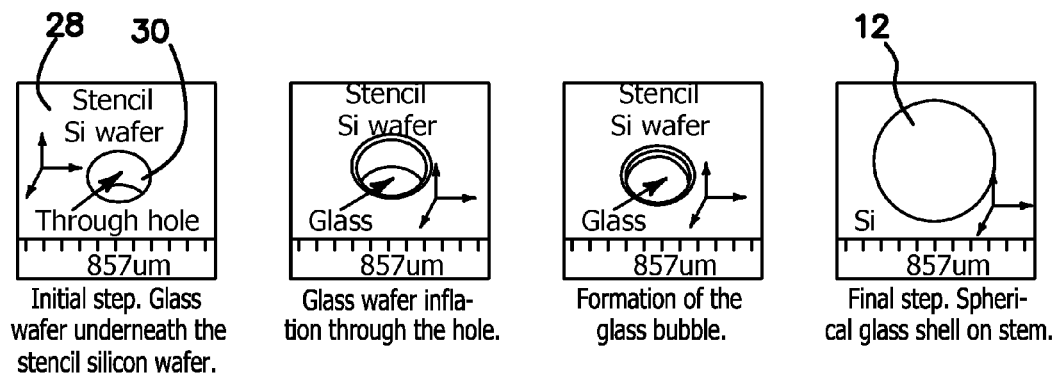

Initial step. Glass wafer underneath the stencil silicon wafer.

FIG. 8A

Glass wafer inflation through the hole.

FIG. 8B

Formation of the glass bubble.

FIG. 8C

Final step. Spherical glass shell on stem.

FIG. 8D

THREE-DIMENSIONAL WAFER-SCALE BATCH-MICROMACHINED SENSOR AND METHOD OF FABRICATION FOR THE SAME

RELATED APPLICATIONS

The present application is related to U.S. Provisional Patent Application Ser. No. 61/250,849, filed on Oct. 12, 2009, which is incorporated herein by reference and to which priority is claimed pursuant to 35 USC 119.

GOVERNMENT RIGHTS

This invention was made with Government support under Grant No. 70NANB5H1235, awarded by the National Institute of Standards and Technology, and contract NOO178-08-C-1014 awarded by the Naval Surface Warfare Center. The Government has certain rights in this the invention.

BACKGROUND OF THE INVENTION

1. Field of the Invention

The invention relates to the field of batch fabricated micromachined gyroscopes and more particularly to batch fabricated micromachined rate integrating and angular rate gyroscopes and more generally to microscale spherical resonators.

2. Description of the Prior Art

The recent market survey of today's inertial sensors suggests the increasing demand for portable low-cost, and high-precision gyroscopes for communication systems, civil and military navigation. The gyroscopes can be classified into two major types: rate integrating (type 1) and angular rate (type 2). The type 1 gyroscopes are typically isotropic oscillators, which transfer energy between the normal modes of vibration (alternatively, principal axes of elasticity) when subject to inertial rotation. The intrinsic property of such resonators is the precession of the vibration axis in response to the inertial input, with the precession angle proportional to the rotation angle. When gyroscope of type 1 is implemented in the form of a vibrating axisymmetric solid body (for example, a shell), the elastic wave propagating in a body is used to directly measure the angle of rotation.

One implementation of the isotropic oscillator concept, the quartz hemispherical resonator gyroscope (HRG) demonstrates the potential of rate integrating gyroscopes (type 1) with inertial and higher grade performance. A disadvantage of the current technology for HRG is its extremely high cost, mainly due to a boutique manufacturing process. Although conventional HRG is widely used for precision inertial navigation and guidance applications, it is not suitable for man portable application because of its size, weight and power (SWaP) metrics.

BRIEF SUMMARY OF THE INVENTION

The illustrated embodiment is described in terms of a gyroscope, but it is to be expressly understood that the invention is applicable to any type of dynamic sensor, now known or later devised, for example, including without limitation not only all types of vibratory gyroscopes based on a resonator—both rate and rate integrating, but any resonators (e.g. for frequency references, clocks, filters), and/or resonant chemical sensors based on the frequency shift due to added mass (also called micro-balances). Thus, it is within the express contemplation of the scope of the invention to characterize an illustrated embodiment of the invention as a high performance microscale spherical resonator generically employed in sensor applications.

Further, in the illustrated embodiments reference is made to glass or glassblowing as part of the fabrication steps. Again, wherever "glass" or "glassblowing" is referenced, it must be understood in this specification and its claims that any thermoplastic deformable material is intended to be included and the methods known for deforming the same. In the illustrated embodiments examples with Pyrex glass are provided. It must expressly be understood that the term "glass" includes within its scope other materials suitable for high temperature plastic deformation driven by pressure and surface tension forces ("glassblowing"). Specific examples are low thermal expansion glasses and glass-ceramics such as Zerodur®, ultralow expansion titania silicate glass, amorphous quartz (silica), and materials known in the art to be similar. Accordingly, the invention includes the use of materials in vibratory resonators other then silicon as the "glassblowing" substrate, e.g. silicon would not be compatible in combination with some of the higher temperature glasses. By way of illustration, titania silicate, fused quartz, graphite, and silicon carbide can be used as the substrate instead of silicon wafers. It is advantageous to choose a material for the substrate which matches the thermal expansion coefficient of the material used for gyroscope or sensor and also able to sustain the temperatures required for the thermoplastic deformation of structural material, such as in the "glassblowing" step. Glassblowing titania silicate spherical shells on etched quartz substrates may provide the highest performance gyroscope.

The illustrated embodiments of the invention include a gyroscope including a three-dimensional batch-micromachined shell adapted to vibrate and support elastic wave propagation and wave precession in the shell or membrane and at least one driving electrode and preferably a plurality of driving electrodes directly or indirectly coupled to the shell to excite and sustain the elastic waves in the shell. The pattern of elastic waves is determined by the configuration of the driving electrode(s). At least one sensing electrode and preferably a plurality of sensing electrodes are provided to detect the precession of the elastic wave pattern in the shell. The rotation of the shell induces precession of the elastic wave pattern in the shell which is usable to measure the rotation angle or rate of the gyroscope.

In the illustrated embodiment the above elements of the gyroscope are batch micro-machined on a substrate, which is diced into a plurality of finished chips. The driving and sensing electrodes are thus batched fabricated as disclosed below on chip.

The pattern of elastic wave is determined by configuration of the plurality of driving electrodes as is the detecting of the precession of the elastic wave pattern in the shell by the pattern sensed by the plurality of sensing electrodes.

In one embodiment the driving electrode(s) comprises a three-dimensional transducer and the sensing electrode(s) comprises a three-dimensional sensor.

The three-dimensional batch-micromachined shell may be formed in the shape of an at least partially or substantially spherical shell, the base of the spherical shell is communicated to the cavity in the substrate and is open, hence the sphere is not a perfectly closed spherical surface and it is truncated where it communicates with the substrate. Further, the shell is blown in free space and gravity or other manufacturing artifacts may deform the shape slightly from a mathematically perfect sphere. It is thus understood that the shapes need not be mathematically complete or exact, but are generally spherical in appearance to the unaided eye.

In fact, in some embodiments the three-dimensional batch-micromachined shell is an at least partially hemispherical shell. In other words, a portion of the spherical shell is removed. The remaining portion may be a half sphere or any greater or lesser fraction of a sphere. Regardless of the amount removed or remaining, the shell is referenced in this specification and claims as a "hemispherical shell".

In some embodiments the sensing and/or driving electrodes are disposed in or on, in whole or part on a plurality of spheres circumferentially disposed around the central vibrating shell. In another embodiment the sensing and/or driving electrodes are disposed in or on, in whole or part on an at least partially formed torus circumferentially disposed around the central vibrating shell. Again the torus is partially formed in that it is truncated on its surface where it is mounted on the underlying substrate and may include various fabrication artifacts which might perturb the shape of the toroidal shell from that of a perfectly formed torus. However, the shape is understood to be generally toroidal as it appears to the unaided eye.

The gyroscope further includes a base and in one embodiment the three-dimensional batch-micromachined shell comprises an at least partially hemispherical shell with a stem coupled to the base. In this embodiment, the shell is referred to as a "wine-glass shell".

In another embodiment the driving electrode includes a three dimensional capacitive transducer which is comprised in turn of a stack of an inner and outer conductive film with an interlying dielectric layer therebetween. A plurality of stacks may also be employed. The stack(s) is disposed on or in the shell with the configuration of the stack(s) defining an elastic wave pattern in the shell when the shell is driven by the stack(s). In some embodiments, the capacitive transducer includes submicron-gap capacitive electrodes made by using a sacrificial material between fused shells as described in the methods discussed below.

Thus, the illustrated embodiments include the use of three dimensional metal or semiconductor electrodes not only for capacitive actuation and detection in vibratory sensors, but also for piezoelectric, piezoresistive, and electromagnetic actuation and detection. A spherical gyroscope or resonator is intended to be combined with different types of actuators and pick-offs including, but not limited to electromagnetic drive and capacitive pick-offs.

The stack(s) comprises a pair of submicron-gap capacitive electrodes disposed on or in the shell.

In still another embodiment the driving electrode(s) comprises a piezoelectric layer disposed on or in the shell.

The illustrated embodiments of the gyroscope further include a first and second separate wafer, using for example silicon-on-insulator (SOI) technologies, where the shell is mounted on the first wafer and where the driving and sensing electrodes are defined on the second wafer, which in turns is comprised of separate dies for separately carrying the sensing and driving electrodes. The shell is provided with a conductive layer to enable capacitive detection and actuation by the SOI driving and sensing electrodes. The second wafer is self-aligned with the shell during self-inflation of the shell inside a pre-etched opening defined through the second wafer through which the shell self-inflates. During the basic glassblowing the shell expands and fills the cylindrical opening thus providing in-situ self-alignment and bonding to the second wafer.

The illustrated embodiments further include a method for batch fabrication of three-dimensional shells used as vibrational membranes for a gyroscope comprising the steps of defining a plurality of cavities of a predetermined volume into a substrate prior to glassblowing, disposing a planar glass layer over the substrate and trapping a gas in the cavities of a predetermined volume, and self-inflating the shells through the glass layer by heating the glass layer to a plastic state and gas in the plurality of cavities.

The step of self-inflating the shells through the glass layer self-inflates the shells into free space thereby forming shells with spherical geometry driven by uniform pressure distribution and surface tension forces. The method may continue with the step of etching away or physically removing an upper portion of the spherical shells to form hemispherical shells.

The step of etching away or physically removing an upper portion of spherical shells to form hemispherical shells comprises the steps of disposing a masking material on the spherical shells and selective etching the shells, or encapsulating the shells with a sacrificial material and polishing or lapping down the encapsulated shells to form hemispherical shells.

The method in an embodiment further comprises the steps of forming a stem on each of the shells by disposing a stencil layer to the planar glass layer prior to self-inflating the shells, the stencil layer having stem holes defined therethrough to define the shape of the stems, and self-inflating the shells through the stem holes of the stencil layer.

The method may then further comprise the step of etching away or physically removing an upper portion of spherical shells to form shells with a wine-glass shape. The method may also comprise partial or complete removal of the stencil wafer material to form a free standing stem.

The step of defining a plurality of cavities of a predetermined volume into a substrate prior to glassblowing includes the step of defining a plurality of continuous ring cavities into the substrate prior to glassblowing to provide toroidal shells. In the illustrated embodiment, the toroidal shells are used to carry the sensing or driving electrodes, although use of toroidal shells for the vibrating membrane or shell of the gyroscope is also contemplated.

The illustrated embodiments further include the steps of selectively disposing conductive patterning on the planar glass substrate prior to glassblowing and forming a predetermined three-dimensional metal pattern on the surface of the shell during self-inflating glassblowing where the metal pattern plastically deforms along with the self-inflation of the glass substrate. Thus, the electrodes and conductive traces coupled to the electrodes in and on both the vibrating shell and the circumferential supporting shell or shells are shaped at the same time as the shells themselves are formed or self-inflated glass spheres.

a. The illustrated embodiments further include the step of disposing a selected layer of material on or in the formed shells, and dissolving or removing the formed glass shell leaving a shell composed of the selected layer of material. For example, polycrystalline silicon (PolySi), amorphous silicon (aSi), polycrystalline silicon carbide (PolySiC), noble metals or any other material is deposited or disposed on the glass shell as a coating and the glass shells dissolved or otherwise removed to obtain a shell made of polycrystalline silicon (PolySi), amorphous silicon (aSi), polycrystalline silicon carbide (PolySiC), noble metal or other material. Low internal loss materials such as titania silicate (TSG), Zerodur® low expansion glasses and quartz.

The illustrated embodiments of the method include the steps of selectively disposing conductive patterning on the planar glass substrate prior to glassblowing; selectively disposing a sacrificial layer of material on the patterning on the planar glass substrate prior to glassblowing; forming a predetermined three-dimensional conductive pattern on the surface of the shell during self-inflating where the conductive pattern covered with the sacrificial material plastically deforms along with the self-inflation of the glass substrate; fusing two or more shells covered with the sacrificially coated conductive pattern; and removing the sacrificial layer to form three-dimensional submicron-gap capacitive electrodes on the surface of the shells.

The embodiments further include disposing a selected layer of material on or in the formed shells or disposing a selected layer of material on the planar layer prior to glassblowing and plastically deforming the selected layer with the self-inflation of the glass substrate, and employing the selected layer on the formed shell as a dielectric layer of an internal dielectric transducer or piezoelectric layers for electromechanical transduction, or providing additional layers on the formed shells using micromachining, including combinations of patterning and doping of deposited materials.

The illustrated embodiments further include the steps of chemically treating the shells to decrease roughness and improve performance of the microshell resonator gyroscope (MSRG) formed therefrom by polishing of an inner and outer surface of the shells by means of wet or vapor phase of processing.

The step of disposing a planar glass layer over the substrate and trapping a gas in the cavities of a predetermined volume comprises glass-to-glass bonding of the planar glass layer to the substrate where the substrate is comprised of a quartz wafer using a thin film as an intermediate layer for bonding.

The illustrated embodiments further comprise the step of defining significantly narrower stem holes in the stencil wafer in comparison with the cavity size defined in the substrate to fabricate a variably sized shell or independently controlling the volume of the gas trapped in the cavities to fabricate a variably sized shell.

The illustrated embodiments of the invention include an apparatus and method for the fabrication methods and designs for a three dimensional wafer-scale batch-fabricated angle/angular rate microshell resonator gyroscope (MSRG) with on-chip actuation and detection. The proposed wafer-level methods for the gyroscope allow batch fabrication of three-dimensional isotropic microshells of various geometries using extended glass-blowing technology. The gyroscope on-chip actuation and detection take advantage of the three-dimensional micromachining for metal patterning on the surfaces of microshells as well as wafer-level fabrication of multi-material structures using the shell array as a three-dimensional substrate.

The gyroscope is a three-dimensional isotropic oscillator, which measures angle or angular rate of a rotating object. The fundamental principle is the precession of a shell vibration axis in response to the inertial input, with the precession angle proportional to the rotation angle of measured object. The disclosed wafer-level techniques are not limited by the MSRG batch fabrication, but enable a broad class of three dimensional multi-material resonant structures and instruments for inertial applications, such as consumer, communications systems, civil and military navigation.

With the emergence of micromachining technology, the batch fabrication of shells is anticipated. Previously limited by planar technologies, the micromachining has advanced to the fabrication of glass shells on a wafer scale using recently developed glass-blowing technologies. The technology of the disclosure is based on the wafer-scale self-inflation of miniature glass bubbles at high temperatures. Expansion of gas trapped in a sealed cavity causes the formation of three-dimensional shells out of planar substrate. Below we refer to this technology as basic glassblowing.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

BRIEF DESCRIPTION OF THE DRAWINGS

FIG. 3b is a perspective view of a MSRG with separately fabricated and aligned three dimensional electrodes.

FIG. 3c is a perspective view of a Wine-glass MSRG with spherical three dimensional electrodes.

FIGS. 4a and 4b are top plan views of the gyroscope which provide conceptual illustration of elastic wave pattern precession for the different modes of operation (angle/angular rate). The overlapping depictions illustrate rotation of a gyroscope case. Rotation causes an elastic wave pattern to slew from initial position (dotted lines) to final position (solid lines). FIG. 4a illustrates the angle operation. The elastic wave is excited and maintained along an arbitrary direction to allow its free precession. The pattern slews to the angle $\phi$ proportional to the angle of rotation, $\alpha$. FIG. 4b illustrates the angular rate operation. The elastic wave is excited and maintained along the drive direction, x (relative to the gyroscope case). The rotation induces vibration in the sense direction, y and slew the pattern to the angle $\omega$ proportional to the angular rate, $\Omega$.

FIGS. 5a and 5b are diagrams which illustrate the average nodal displacements of the first and second modes of a wine-glass shell, respectively, as viewed from the top. FIG. 5a shows the half-periods of vibration of a first mode and FIG. 5b the half-periods in a second mode.

FIGS. 6a and 6b are the average nodal displacements of third and fourth modes of a hemispherical shell, respectively, as viewed from the top.

FIGS. 7a and 7b are optical photographs of wafer level batch micromachined spherical glass shells coated with polycrystalline silicon layer. FIG. 7a shows an array of glass-blown spherical shells on a wafer coated with a polycrystalline silicon layer. The individual shells are used as the sensitive element of a MSRG. FIG. 7b is an enlarged cross sectional photograph of a single shell of FIG. 7a.

FIGS. 8a-8d are scanning electron microscope (SEM) images which illustrate the steps of forming a shell on a stem.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

Figure 1:
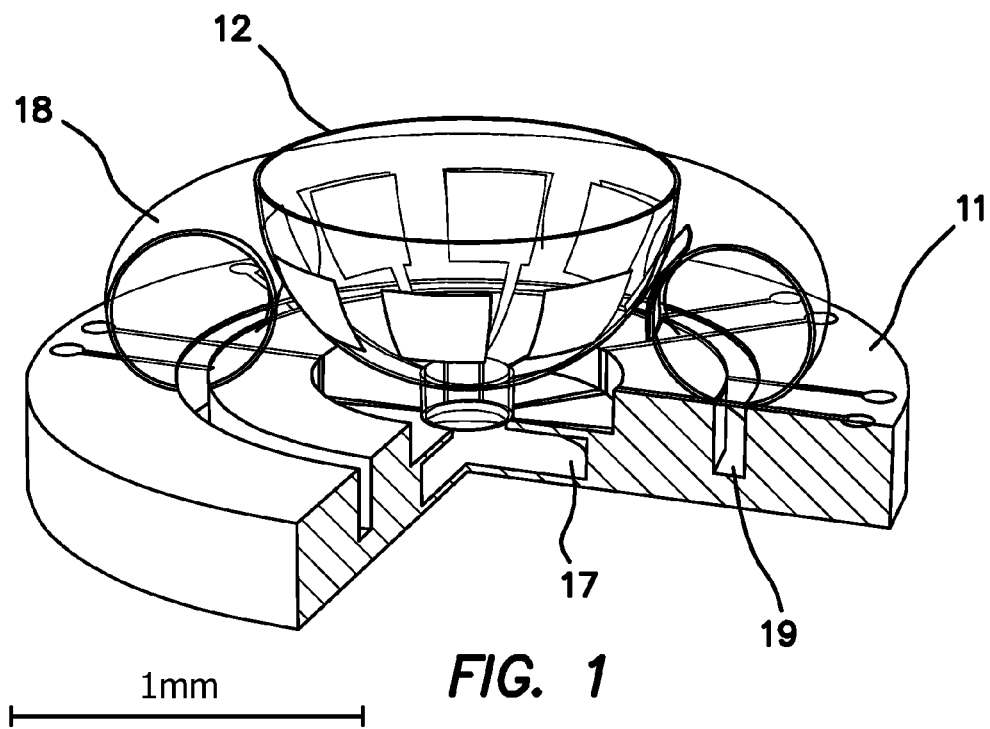
FIG. 1 is a conceptual diagram of three-dimensional batch-micromachined hemispherical shell on a stem resonator gyroscope according to the illustrated embodiment of the invention.

A three-dimensional wafer-scale batch-fabricated angle/angular rate microshell resonator gyroscope (MSRG) 10 with on-chip actuation and detection, as diagrammatically shown in FIG. 1. The various designs and fabrication methods for MSRG using extended glass-blowing techniques are also disclosed. These wafer-level techniques are not limited by the MSRG fabrication, but enable a broad class of novel three-dimensional multi-material resonant structures for inertial applications.

Figure 3A:
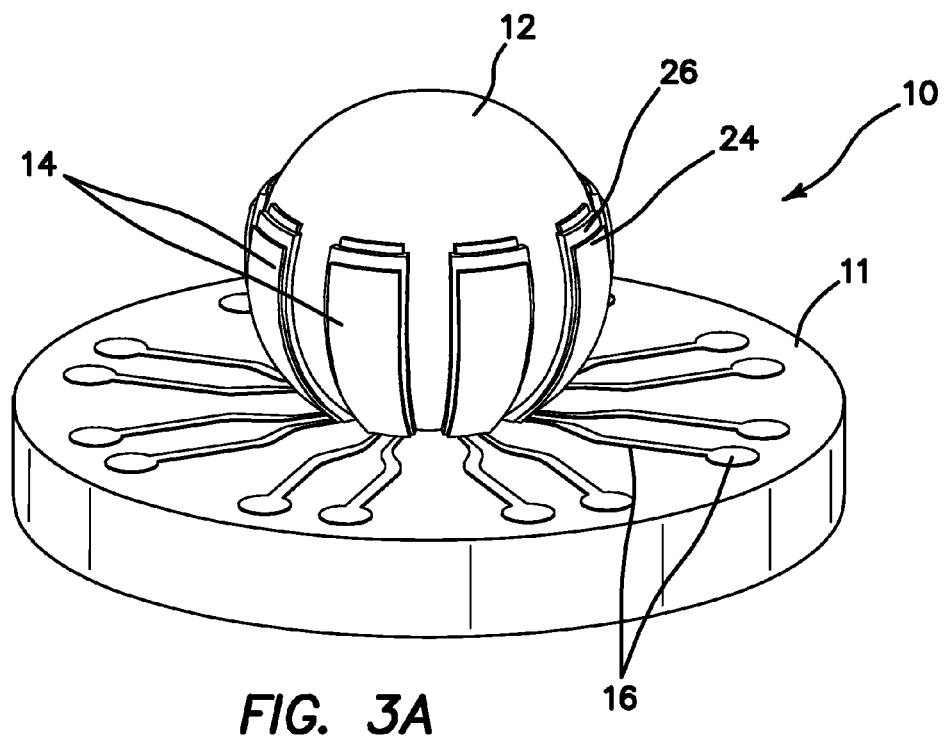
FIG. 3a is a perspective view of a microshell resonator gyroscope (MSRG) with three dimensional transduction mechanism enabled by multi-layer in-situ fabricated conductive and dielectric layers.
Figure 3D:
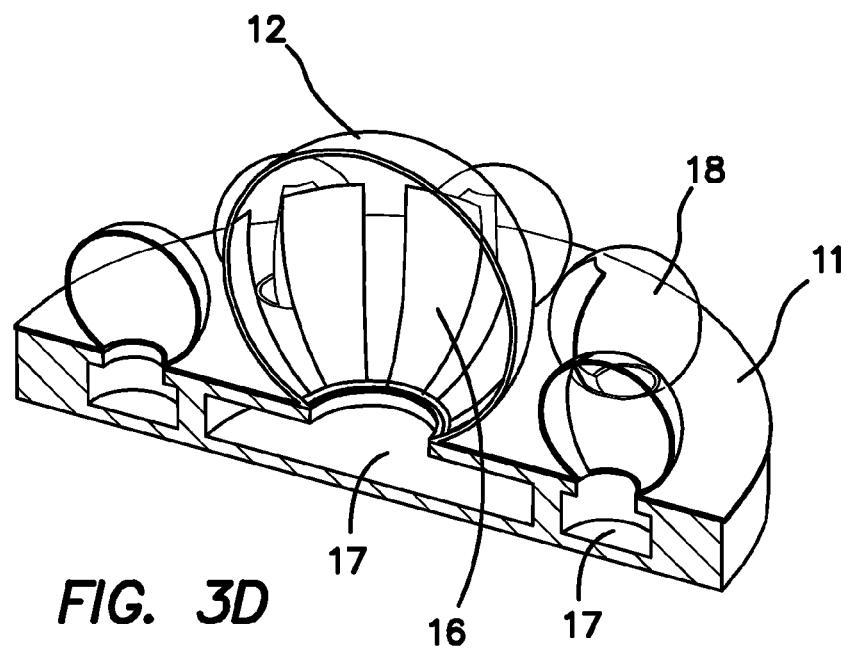
FIG. 3d is a cutaway perspective view of the stemless MSRG with spherical three dimensional electrodes.

Three different structural implementations of the MSRG concept are shown in FIGS. 3a-3c. While these designs differ in resonant shell geometry and transduction mechanism, the main operational principle remains the same in each. The gyroscope operation is explained in detail below using an example of wine-glass MSRG 10 with spherical electrodes. Other possible configurations are also discussed, namely: "MSRG with three-dimensional transduction mechanism," and "MSRG with separately fabricated electrodes."

The illustrated MSRG 10 is an isotropic oscillator, which supports elastic wave propagation on a three-dimensional shell 12. Any implementation of MSRG concept comprises a vibrating axisymmetric shell 12, a sensing element 14 of the gyroscope 10, and a combination of electrodes 16 for actuation and detection of an elastic wave pattern. In the embodiment of FIG. 1 gyroscope 10 is formed and/or mounted on a substrate 11. The elastic wave is excited by driving the resonant shell 12 to one of its vibration modes. When rotation is applied to the gyroscope 10, the Coriolis force transfers energy between the degenerate modes of vibration (i.e. single eigenvalue), thus causing elastic wave pattern to precess. The amplitude and location of the elastic wave pattern is then used to determine rotation angle or rate.

Modes of Operation

Any implementation of MSRG 10 is capable of measuring both absolute angle of rotation and angular rate. To describe modes of operation we refer to the embodiment called "wine-glass MSRG 10 with spherical electrodes", shown in FIGS. 4a and 4b and described below. In this configuration, the resonant wine-glass shell 12 is surrounded by spherical glass spheres 18, which are used as three-dimensional electrodes. The metal pads 16 on the surfaces of resonant shell 12 together with surrounded metalized spheres 18 form a set of electrostatic capacitive electrodes for actuation and detection of an elastic wave pattern.

Figure 4A:
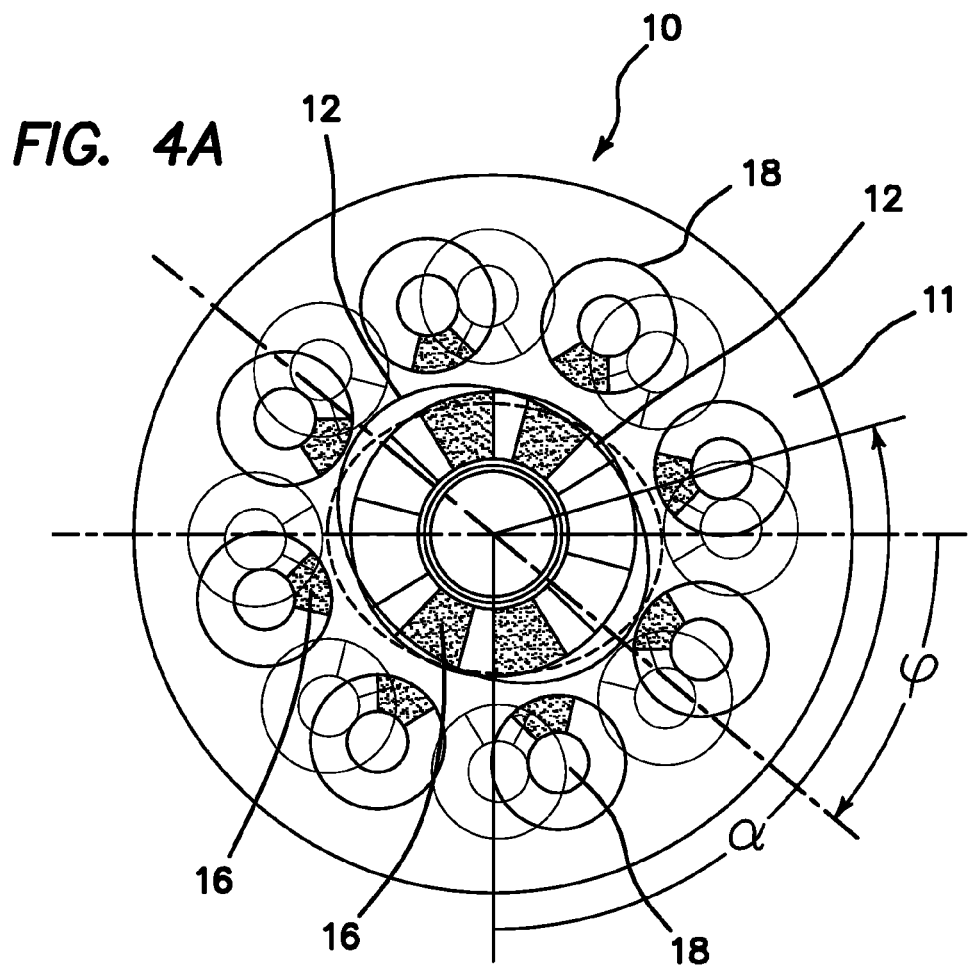

FIGS. 4a and 4b also illustrate the key property of MSRG 10 as an isotropic oscillator, namely pattern precession independence from the gyroscope rotation. The two overlapped depictions show the spatial orientation of the gyroscope case before rotation (shown in shadow) and after rotation (highlighted). The vibration pattern of the elastic wave before and after case rotation is shown in dotted and solid line accordingly.

For an angle operation, shown schematically in FIG. 4a, the elastic wave is excited along any arbitrary direction and maintained in order to allow its free precession. The rotation applied along the symmetry axis of resonant shell 12 causes the elastic wave pattern to slew in the opposite direction by an angle $\phi$ proportional to the rotation angle $\alpha$. Due to the symmetry of three-dimensional shell 12, MSRG 10 is capable of sensing two, and in principle, three axes of rotation with a single resonant element.

For an angular rate operation, shown schematically in FIG. 4b, the elastic wave is excited and maintained along the drive direction, x (relative to the gyroscope case). The rotation induces vibration in the sense direction, y; which in turn slews the pattern to the angle $\omega$ proportional to the angular rate, $\Omega$. To maximize the detected velocity and displacement of a resonant shell 12, the spatial orientation of the drive and sense directions are chosen to be 45 degree relative to each other. However, different orientations of electrodes can be used to sense the vibration induced by the Coriolis force.

In other words, there are two distinct strategies for the elastic wave control: (1) open-loop, when elastic wave is excited with constant oscillating amplitude and allowed to precess freely (with inertial rotation); and (2) closed-loop, when elastic wave is excited and forced to remain fixed by feedback control. While closed loop operation is meant to provide accurate, but limited in range angular rate information, open-loop operation with quadrature compensation provides the capability of measuring angle directly.

Elastic Wave Pattern

Figure 2A:
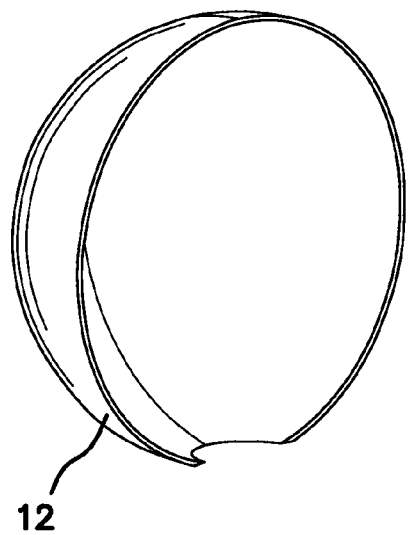
FIG. 2a is a perspective diagram of a spherical shell employed as the shell resonator.
Figure 2B:
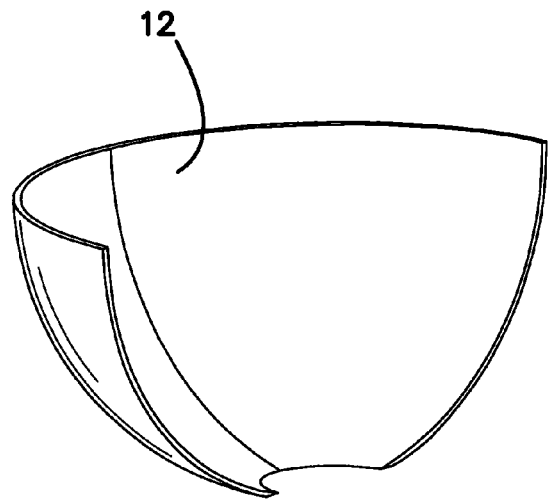
FIG. 2b is a perspective diagram of a hemispherical shell employed as the shell resonator.
Figure 2C:
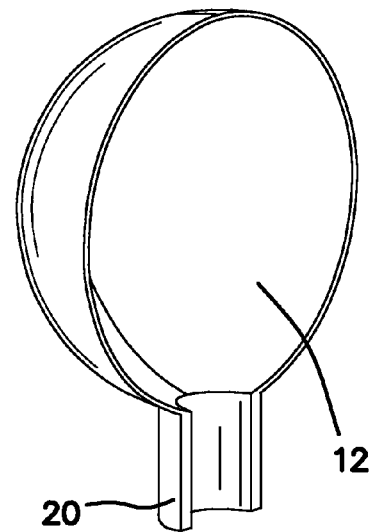
FIG. 2c is a perspective diagram of a spherical shell on a stem.
Figure 2D:
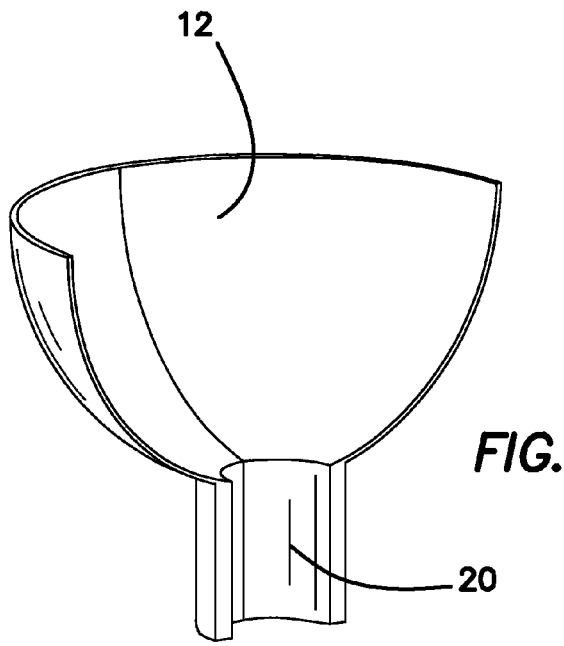
FIG. 2d is a perspective diagram of a hemispherical shell on a stem or with wine glass shape.

The shape of the first two degenerate vibration modes of a wine-glass shell 12 of FIG. 2c, with a stem 20 fixed at the bottom is shown in FIGS. 5a and 5b. The top of the wine-glass shell 12 is deforming as a single oscillating structure, from circular shape to elliptical. Usually the first/second mode of a hemispherical shell 12 supported through the fixed stem 20 has four nodes with four antinodes. A node is a point on the shell that does not vibrate (zero displacement condition). The antinodes (maximum displacement condition) alternate with nodes in the direction of vibration. The spatial orientation of the two modes is 45 degree relative to each other. When the shell is driven to resonance in the first mode, FIG. 5a, the response to the Coriolis force excites vibration in the second mode, FIG. 5b. The resulting elastic wave pattern is a superposition of these vibration modes. Subsequent modes of vibration occurs at higher frequency, and generally have higher quality factor assuming equal energy dissipation mechanism for every vibration mode.

The shape of the second pair of degenerate vibration modes with stem 20 fixed at the bottom is shown in FIGS. 6a and 6b. There are six nodes alternate with six antinodes for each mode. Due to the symmetry of the structure the vibration modes have a 60 degree repeatable pattern. Similar to the previous case, an inertial rotation applied to the shell 12 vibrating in the third mode, FIG. 6a excites vibration along the axes of the fourth mode, FIG. 6b (oriented 30 degree relative to the axes of the third mode).

Wine-Glass MSRG with Spherical Electrodes

One embodiment of the gyroscope 10, called "wine-glass MSRG with spherical electrodes", is shown conceptually in FIG. 3c and FIGS. 4a and 4b. It is comprised of a wine-glass resonant glass shell 12 with metallized electrodes 16 on the outer surface surrounded by metallized electrodes 16, which are patterned on separate hollow glass spheres 18. It is to be understood that the scope of the invention includes either the use a spherical or hemispherical shell 12 as a sensitive element and use of a piezoelectric layer on the shell's surface as a three-dimensional transduction mechanism.

Configuration of Electrodes

The electrodes 16 of "wine-glass MSRG with spherical electrodes," shown in FIGS. 4a and 4b are configured in a way to effectively sustain and detect an elastic wave pattern, which is a first or third order flexural vibration mode of the wine-glass resonant shell 12. The metal pads 16 on the surfaces of the resonant shell 12 together with surrounding metallized shells 18 form a set of electrostatic capacitive electrodes 22 for actuation and detection of an elastic wave pattern.

The vibration mode of a wine-glass resonant shell 12 can be excited by applying a voltage to a combination of capacitive electrodes along the drive direction. The precession of elastic wave pattern can be detected by a combination of capacitive electrodes 22 along the sense direction. The oscillating deformations of wine-glass resonant shell 12 change the capacitive gaps, thus causing an overall change in the variable capacitance, measurement of which is used to detect the motion. Due to the symmetry of configuration, amplitude and location of elastic wave pattern can be determined by any combination of electrodes 16, 18, 22 as well as higher order vibration modes can be excited by increasing the number of surrounding electrodes.

Other MSRG Implementations

Various configurations of MSRG 10 are within the scope of the invention other than those discussed above. While the embodiments differ in resonant shell geometry and electrode configuration, the main operational principle described above and the vibration modes for shells of various geometries, as discussed in connection with FIGS. 2a-2d, remain the same.

Figure 2E:
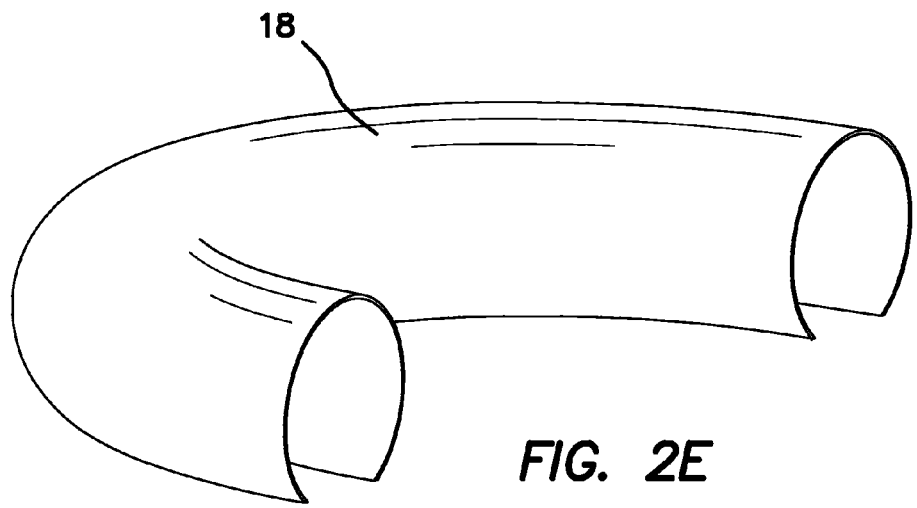
FIG. 2e is a perspective diagram of a shell of a torus shape.

The scope of the invention further includes an embodiment where the circumferential shells 18 carrying the sensing electrodes are is not spherical but are provided in the shape of a torus or partial torus as shown in FIGS. 1 and 2e. The toroidal shells 12 are fabricated by defining continuous ring cavities 19 into substrate 11 prior to glassblowing. Still further shapes for shell 12 or 18 may have even lower degrees of symmetry, such a two-, three-, four-, six-, or eight-fold symmetries and formed by glass blow molding into any shape, including entirely asymmetric shapes, if desired.

MSRG with Three-Dimensional Transduction Mechanism

Another embodiment of the gyroscope 10, called "MSRG with embedded three-dimensional transduction mechanism," is conceptually illustrated in FIG. 3a. It is comprised of a spherical or hemispherical resonant glass shell 12 and the capacitive transducer 22 formed by a stack of conductive films 24 on a shell surface with internal or sandwiched dielectric layer. The topology of stack 24 defines the pattern of elastic wave. The sub-micron capacitive gap and high-K dielectric layer 26 in this configuration may potentially lead to superior performance in comparison with other MSRG implementations. It is expressly contemplated as within the scope of the invention that either use of hemispherical or wine-glass shell 12 as a sensitive element or use of piezoelectric layer on shell surface as a three-dimensional transduction mechanism could be employed.

MSRG with Separately Fabricated Electrodes

The embodiment of the gyroscope 10, called "MSRG with separately fabricated electrodes," is shown conceptually in FIG. 3b. It is comprised of a spherical resonant glass shell 12 mounted on substrate 11 coated with conductive layer to enable capacitive detection and actuation by the driving and sensing electrodes 16 defined on separate dies 13a and 13b respectively (for example, SOI dies). A stringent and reliable structural design of dies 13a and 13b along with the self-alignment of SOI substrate 11 during the fabrication may potentially lead to higher robustness of this configuration in comparison with other MSRG embodiments. The scope of the invention expressly includes either use of spherical, hemi-spherical, or wine-glass shell 12 as a sensitive element.

The fabricated subsystems of the gyroscope 10 include spherical shells 12 coated with polycrystalline silicon, spherical shells 12 on a stem 20, and spherical metal electrodes 18. The subsystems demonstrate the feasibility of the claims and prove that fabrication of the complete MSRG 10 is possible at the wafer level.

Fabrication of High Quality-Factor Spherical Shells

The illustrated embodiment includes spherical glass shells 12 coated with polycrystalline silicon of micrometer scale thickness, which can be used as a sensitive element for MSRG 10. These shells 12 are expected to have higher intrinsic quality factor than borosilicate glass. The doped polycrystalline silicon film may also serve as a complementary conductive layer for the capacitive actuation of a vibrating shell. The scope of the invention expressly includes either use of polycrystalline silicon or other materials such as low expansion glasses, e.g. Zerodur®, ultralow expansion titania silicate glass, or amorphous quartz.

The steps of fabrication comprise glassblowing the shell 12 and subsequent low-pressure chemical vapor deposition (LPCVD) of polycrystalline silicon on the shell 12. Consider an example of the glassblowing step. A 1 mm thick silicon wafer with 750 μm deep pre-etched cylindrical cavities or blind holes of 500 μm in diameter is anodically bonded to a 100 μm thick Pyrex 7740 wafer, a type of a borosilicate glass. The wafer stack of the silicon and Pyrex wafers was then placed in a quartz tube furnace set at 850° C. for air expansion inside the sealed cavities. The air or gas trapped in the cavity 17, when heated provides a predetermined or measured amount of gaseous expansion determined by the size of the cavity 17 and the amount of trapped gas, which blows a spherical bubble or shell out of the overlying planar glass layer.

An array of glass-blown spheres with polycrystalline silicon layer is shown in FIG. 7a, thus demonstrating feasibility of proposed fabrication methods on a wafer level. The individual spherical shell of FIG. 7b may be used as a sensitive element of MSRG 10. The wafer stack and the profile of glass shell of few micron in thickness can be determined from sawed cross section of individual die shown in FIG. 7b.

Fabrication of Spherical Shells on Stems

Consider now the spherical glass shells 12 on stems 20, which can be used as a sensitive element for MSRG 10. The molded glass stem 20 is expected to minimize undesirable coupling of the vibrating shell 12 with the support structure, reduce dissipation of energy through the substrate 11, and maximize the Quality factor. The shells 12 on stems 20 were fabricated by inflating glass bubbles through an additional stencil layer. The fabrication methodology comprises the following steps. The wafer stack with sealed cavities is formed following the glassblowing recipe discussed above. Next, a 300 μm silicon wafer with etch-through holes of 300 μm in diameter is anodically bonded to the wafer stack. This additional wafer acts as a stencil layer to define stems 20 during glass molding in the quartz tube furnace.

The process of stem formation is shown in FIGS. 8a-8d. SEM images captured at different instances of the glassblowing represent how a flat glass wafer is squeezed through an etch hole 28 of a stencil wafer 30 to form a glass shell 12 on a stem 20. In FIG. 8*a* the glass wafer is positioned beneath stencil wafer 30. The etch through holes 28 shown in FIG. 8*a*, guide the shape of a shell 12 during the glassblowing, which is shown emerging in FIGS. 8*b* and 8*c*. As shown in the final step of FIG. 8*d* glass shell 12 is spherical and 600 μm in diameter with a connected glass stem 20 extending through stencil wafer 30. Additional steps include dissolving of the stencil silicon wafer 30 and chemical polishing of the glass surface.

Figure 9:
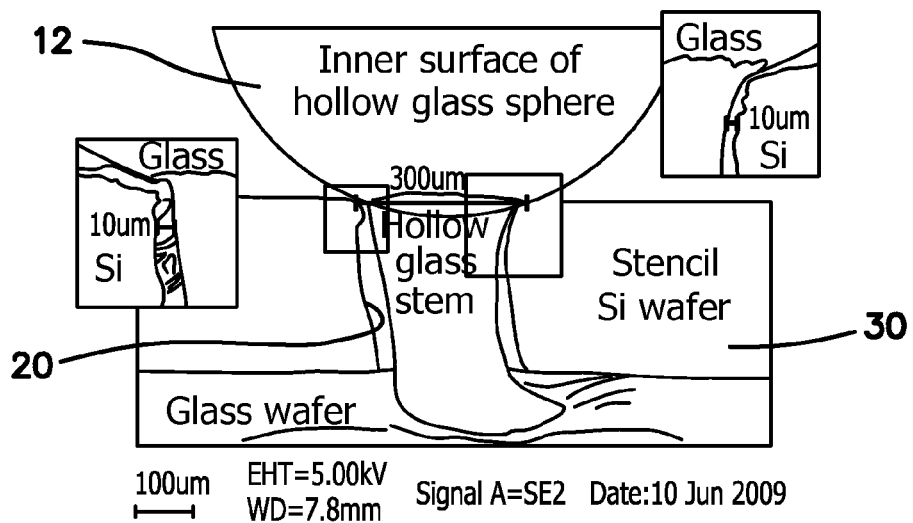
FIG. 9 is a SEM image of a cross section of a glass sphere on a stem formed by the method of FIGS. 8a-8d with insets showing thickness measurements of the stem and base of the sphere.

The wafer stack and the cross section profile of hollow glass sphere 12 on a stem 20 is shown in FIG. 9. From the SEM image it follows that spherical glass shell thickness is in the order of a micron.

Fabrication of Spherical Metal Electrodes

Spherical metal electrodes 16 on the surface of a glass shell 12 can be used as a capacitive electrodes for actuation and detection in MSRG 10. The curved three-dimensional metal pads and traces 16 may be also used to run interconnects for MSRG operation. The fabrication methodology comprises the following steps. A wafer stack with sealed cavities is formed following the glassblowing recipe as disclosed above. Next, metal is patterned on a flat glass wafer using a conventional lift-off process. The stack is then placed in a furnace set at above the softening point of glass. At the high temperatures the air trapped in cavities expands, and glass shells of a spherical shape are formed from glass wafer. At the same time, metal patterned on the glass wafer is plastically deformed due to heat, and the desired three-dimensional traces and pads 16 on a surface of the shell 12 are formed.

Figure 10:
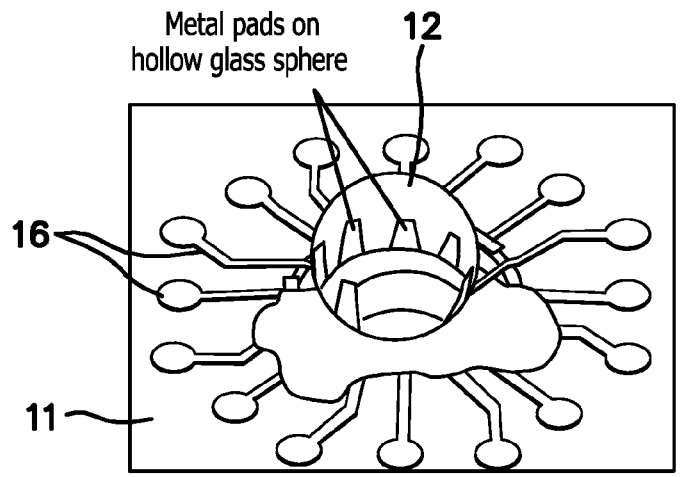
FIG. 10 is an optical photograph of the three dimensional conductive electrode pads and traces on a glass shell.
Figure 11A:
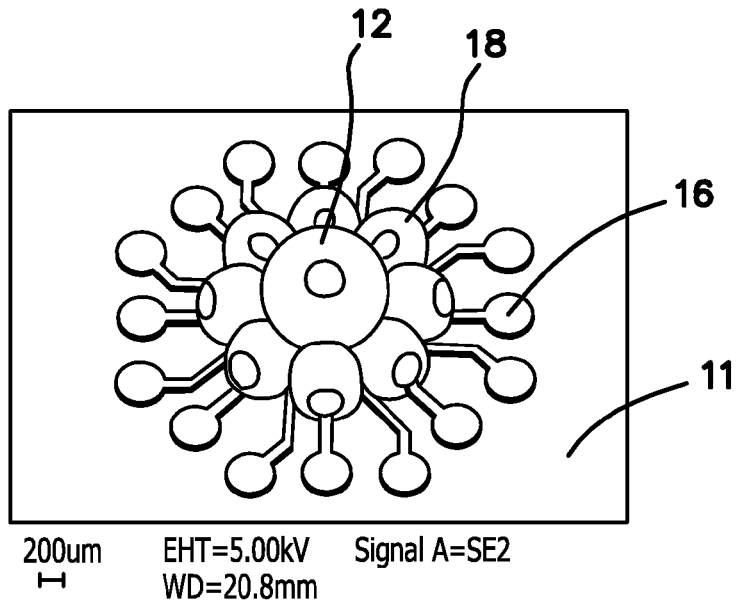
FIGS. 11a and 11b are SEM images of spherical metal electrodes on the surface of a glass shell with FIG. 11b being a close up showing continuity.
Figure 11B:
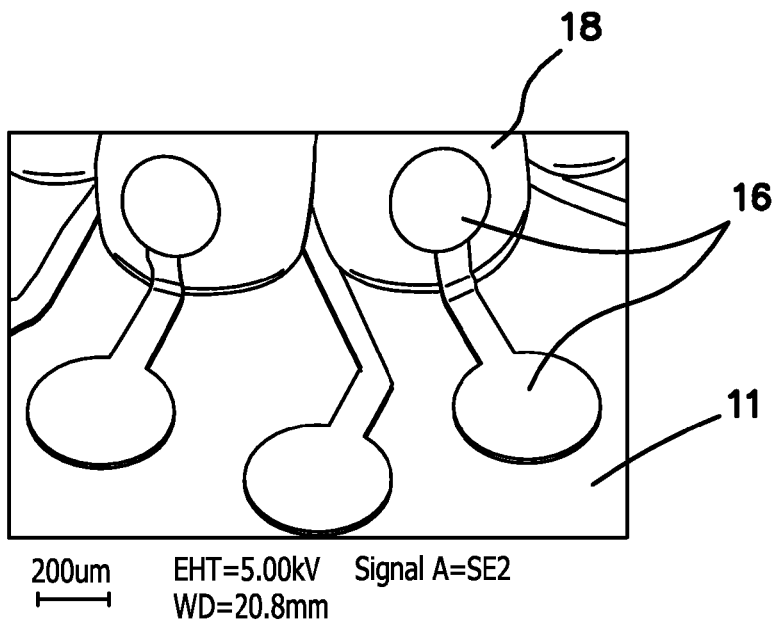

The optical photograph of metal electrodes 16 on the outer surface of spherical glass shell 12 is shown in FIG. 10. An SEM image of another embodiment with curved three-dimensional metal pads and traces is shown in FIG. 11. The close up, FIG. 11*b*, shows the continuity of the metal traces 16 at the shell boundary.

The prior art technologies is limited to planar geometries so that the implementation of a three-dimensional shell resonator gyroscope 10 at a wafer level is not feasible. A broad class of novel three-dimensional multi-material resonant structures and instruments for inertial applications is now enabled by the following disclosed techniques:

a. resonant microshells with batch fabrication of various geometries (in combination with glassblowing technology), b. three-dimensional metal patterning on the surfaces of microshells, and c. multi-material structures fabrication using shell array as a three dimensional substrate.

The fabrication methods and embodiments for the disclosed three-dimensional batch fabricated angle/angular rate microshell resonator gyroscope 10 are suitable for mass production, thereby enabling portable, low-cost, and high-precision inertial sensors for consumer, communications systems, civil and military navigation markets.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A vibratory sensor comprising:

a three-dimensional batch-micromachined shell adapted to vibrate and support elastic wave propagation and precession in the shell;

at least one driving electrode to excite and sustain elastic waves in the shell, the pattern of elastic wave being determined by configuration of the at least one driving electrode; and at least one sensing electrode to detect a vibratory characteristic in the shell induced by interaction of the shell with a force or field which is sensed or measured thereby, wherein the at least one sensing electrode detects precession of the elastic wave pattern in the shell; and where rotation of the shell induces precession of the elastic wave pattern in the shell usable to measure the rotation angle or rate.

2. The vibratory sensor of claim 1 further comprising a plurality of driving electrodes to excite and sustain elastic waves in the shell, the pattern of elastic wave being determined by configuration of the plurality of driving electrodes.

3. The vibratory sensor of claim 1 further comprising a plurality of sensing electrodes to detect precession of the elastic wave pattern in the shell.

4. The vibratory sensor of claim 1 where the at least one driving electrode comprises a three-dimensional transducer.

5. The vibratory sensor of claim 1 where the at least one sensing electrode comprises a three-dimensional support structure.

6. The vibratory sensor of claim 1 where the three-dimensional batch-micromachined shell comprises an at least partially spherical shell.

7. The vibratory sensor of claim 1 where the three-dimensional batch-micromachined shell comprises an at least partially hemispherical shell.

8. The vibratory sensor of claim 1 where the sensing or driving electrodes are disposed on or in an at least partially formed torus circumscribing the shell.

9. The vibratory sensor of claim 1 further comprising a base and where the three-dimensional batch-micromachined shell comprises an at least partially hemispherical shell with a stem coupled to the base.

10. The vibratory sensor of claim 1 where the at least one driving electrode comprises a three dimensional capacitive transducer comprised in turn of a stack of an inner and outer conductive film with an interlying dielectric layer therebetween, the stack being disposed on the shell, configuration of the stack defining an elastic wave pattern in the shell when driven by the stack.

11. The vibratory sensor of claim 10 where the at least one driving electrode comprises a three dimensional capacitive transducer comprised in turn of a plurality of stacks, each having an inner and outer conductive film with an interlying dielectric layer therebetween, the plurality of stacks being disposed on the shell, configuration of the plurality of stacks defining an elastic wave pattern in the shell when driven by the plurality of stacks.

12. The vibratory sensor of claim 11 where the stack comprises a pair of submicron-gap capacitive electrodes disposed on the shell.

13. The vibratory sensor of claim 1 where the at least one driving electrode comprises a piezoelectric layer disposed on the shell.

14. The vibratory sensor of claim 1 further comprising a first and second wafer and where the shell is mounted on the first wafer and where the at least one driving and sensing electrodes are defined on separate dies comprising the second wafer, where the shell is provided with a conductive layer to enable capacitive detection and actuation by the driving and sensing electrodes, the second wafer being self-aligned with the shell during self-inflation of the shell inside a pre-etched opening defined through the second wafer, where during basic glassblowing the shell expands and fills the cylindrical opening thus providing alignment and bonding to the second wafer.

* * * * *